United States Patent [19]

Reim et al.

[11] Patent Number: 4,555,425

[45] Date of Patent: Nov. 26, 1985

[54] TEXTILE SHEET WITH SPECIFIC SURFACE EFFECTS

[75] Inventors: Ingeborg Reim, Cottbus; Gerhard Pohl, Forst; Wolfgang Götzke, Forst; Dieter Wahnberger, Forst; Lothar Postel, Forst; Irmgard Kindlein, Forst; Rudolf Vatter; Manfred Greschke, both of Cottbus, all of German Democratic Rep.

[73] Assignee: VEV Forster Tuchfabriken, Forst, German Democratic Rep.

[21] Appl. No.: 582,986

[22] Filed: Feb. 24, 1984

[51] Int. Cl.$^4$ ............................................. B32B 5/06
[52] U.S. Cl. .................................... 428/91; 26/29 R; 28/107; 28/109; 428/234; 428/300
[58] Field of Search ................. 428/91, 234, 300; 26/29 R; 28/107, 109

[56] References Cited

U.S. PATENT DOCUMENTS

| 1,703,636 | 2/1929 | Rasch | 428/234 |
| 3,365,766 | 1/1968 | Tewksbury et al. | 428/234 |
| 4,425,392 | 1/1984 | Oikawa et al. | 428/234 |

*Primary Examiner*—Marion C. McCamish
*Attorney, Agent, or Firm*—Jordan and Hamburg

[57] ABSTRACT

A method for the production of textile sheets with specific surface effects, and the textile sheet as a product, for outer wear, upholstered furniture or car seat covers or decoration, from yarns of yarn strengths typical for carded yarns (for example, ring-spun yarn, OE Yarn, MJS yarn, friction yarn), generally having low hairiness and low wool portion. This is accomplished in that on one or both surfaces of the textile sheet, a wool fleece remnant is present as the original of the wool fiber portions, the portions penetrating the thread system partially through the entire thickness of the sheet, in the stitch direction of a multiple one or two-sided needle device, and projecting in the stitch direction from the surface of the sheet as a nap, together with such fiber material portions, which have their origin in the textile sheets to be finished. By the needling process, there is a fiber displacement from the fleece through the sheet up to the nap, preferably perpendicular to the surface expansion, by 50 to 1200 perforations per 1 cm$^2$, by felting needles, resulting in a number of known finishing processes for the production of specific nap-like surface effects being replaced and functional possibilities for yarns with lower hairiness being created.

20 Claims, No Drawings

TEXTILE SHEET WITH SPECIFIC SURFACE EFFECTS

BACKGROUND OF THE INVENTION AND PRIOR ART STATEMENT

The invention concerns textile sheets for outer wear, upholstered furniture, or car seat covers or decoration, from rotor (open end), MJS (Murata-Jet), sirospun or friction yarns, of yarn strengths typical for carded yarns, which, following the surface forming process, can be adjusted or finished to certain characteristics.

It is known, according to DE-OS 2522 871, that woven fabrics for furniture upholstery can receive a higher volume, raised effects, as well as a higher tenacity, by mulitple needle processes.

According to DD 0153 502, sheets of 100% synthetic silk can have a nap-like surface, resembling carded yarn, as the result of multiple needling, as well as high surface stretching stability, high thread pulling resistance, and high volume. Color series of home textiles with the same basic pattern are manufactured, according to DE OS 2 821 701, in which pre-stengthened fleeces of synthetic fibers, with large-meshed woven fabrics, are needled as backing surfaces, of the same fiber base.

Depending on the color of the fleece among the large-meshed backing material, equal pattern series with different color tones can be achieved.

SUMMARY OF THE INVENTION

This invention is based on large-meshed, dependent base areas from threads as intermediate product, in which the spaces between the threads are filled with fibers from a pre-strengthened fleece, resulting in an independent sheet with surface stability, pattern and needleloom felt character following the needling process. Within the intent, ambit, and scope of the present invention, it will be understood that the term "sheet" or "textile" also encompasses and includes a web, woven fabric, or the like textile and/or cloth materials.

It is an object of the invention to provide sheets from rotor (open end) or friction yarns, or the like, of yarn strengths typical for carded yarns, without the disadvantages resulting from the respective characteristic yarn construction, i.e., the stomach binder or sugartop effect, firm round yarn cross-section, low hairiness, low wool portion (generally with damaged fish-scale structure of the wool), etc.

The sheet will have fulling and raising-like effects, improving the functional value and the appearance, which are otherwise generally attainable only with several finishing processes and high material losses. The sheets will be adjusted to the respective specific purpose, or "custom made", with respect to the material composition, especially with respect to the wool portion, by means of a finishing process. They can contain fiber materials with very large staple length, dispersion width, and high wool portion.

Thus it is an object of the invention to penetrate textile sheets from rotor (open end), or MJS (Murata-Jet), or sirospun or friction yarns, of yarn strengths typical for carded yarns, with characteristically firm round yarn cross-section, low hairiness and predominantly low wool portion (generally less than 50%), by means of a multiple needling process, in accordance with specific functional demands on the surface, with such selected fiber materials, for example, wool, which could not or only disadvantageously be spun together by means of the aforementioned spinning method.

By penetrating the thread system with quality defining fiber materials and fiber parts from the yarn, the development of an optimum fiber portion, in the respective functional value defining area of the sheet, is assured.

These and other objects and advantages of the present invention will become evident from the description which follows.

DETAILED DESCRIPTION OF THE PREFERRED EMBODIMENTS

In summary, the invention relatrs to a method for the production of textile sheets with specific surface effects, and the textile sheet as a product, for outer wear, upholstered furniture or car seat covers or decoration, from yarns of yarn stengths typical for carded yarns (for example, ring-spun yarn, OE Yarn, MJS yarn, friction yarn), generally having low hairiness and low wool portion. This is accomplished in that on one or both surfaces of the textile sheet, a wool fleece remnant is present as the original of the wool fiber portions, the portions penetrating the thread system partially through the entire thickness of the sheet, in the stitch direction of a multiple one or two-sided needle device, and projecting in the stitch direction from the surface of the sheet as a nap, together with such fiber material portions, which have their origin in the textile sheets to be finished. By the needling process, there is a fiber displacement from the fleece through the sheet up to the nap, preferably perpendicular to the surface expansion, by 50 to 1200 perforations per 1 $cm^2$, by felting needles, resulting in a number of known finishing processes for the production of specific nap-like surface effects being replaced and functional possibilities for yarns with lower hairiness being created.

Thus, the present invention is characterized by the provision of a textile sheet with specific surface effects for outer wear or upholstered furniture or car seat covers or decoration, from yarns of yarn strengths typical for carded yarns, in which the sheet consists of yarns with firm round cross-section, low hairiness, low wool portion, preferably of the thread construction of the rotor (open end), MJS (Murata-Jet), sirospun or friction yarns, and in which on one or both surfaces of the sheet, there is a wool fleece remnant or the like as the origin of wool fiber portions penetrating the thread system partially through the entire thickness of the sheet, in the stitch direction of a multiple one or two-sided needle device, and projecting as a nap in the stitch direction from the surface of the sheet, together with such fiber material parts, which have their origin in the yarn core and/or yarn mantle as hairiness, and/or projecting from the surface of the sheet as a nap, so that there is a higher wool portion in the form of higher hairiness in the thread system, than in the yarn prior to the sheet formation.

Typically, in a preferred mode, the textile sheet with specific surface effects entails a configuration in which the fiber displacement from the fleece through the sheet up to the nap, and from the yarn cross-section up to the nap, runs in a stitch direction of the needles of a multiple one or two-sided needle device, preferably perpendicular to the sheet expansion.

In the present invention, the objects are accomplished in that the textile sheet, preferably consisting of yarns of yarn strengths typical for carded yarns, with firm round yarn cross-section, low hairiness and predominantly low wool portion (generally less than 50%), having been manufactured according to already known sheet formation methods, is penetrated as the web to be finished, by fibers from a finishing surface in the form of a wool fleece in the needle perforation direction. The web to be finished can be perforated by wool fibers from finishing surfaces, originating in a fleece, located on the surface as fleece remnant. The predominant wool fiber portion is preferably removed from the fleece by CB notched needles, possibly in the diametral needle perforation direction, in the thread system of the web to be finished, with high fiber portion, and through the entire thickness of the sheet, up to the opposite surface. Likewise, fiber portions from the entire yarn cross-section of the web to be finished, i.e., from positions of the yarn cross-section, which could not be reached by raising processes, participate in the fiber displacement in the direction towards the surface, ending in a nap. Depending on the perforation direction, depth, and frequency, there can be a thick or thinner, long or shorter, nap, on one or both surfaces of the textile sheet.

In the thread system and in the nap, there is a fiber mixture of wool fibers, and fibers from the yarn and the thread system, with the wool portion in the yarn and the thread system being higher than before the finishing process; generally higher than 50%. Furthermore, the hairiness of the yarn and the volume are considerably higher than before the finishing process, as a result of the fiber displacement from all positions of the yarn cross-section. By the needling process, for example, by means of an already known needleloom felt machine, and the penetration of the thread system with fibers from wool fleeces, which can contain wool fibers with very high staple length dispersion width, for example lambswool, mohair, rag wool, the result is a sheet with high hairiness, loose cross-section and high wool portion of the yarn, with fulling-like fiber displacements and a nap on the surface, i.e., having effects, which in other already known sheets could only be accomplished with threads of other thread constructions, for example, ring-spun yarn, by several finishing processes combined with high material losses, for example, during raising. Finishing processes, such as cutting, pile rotation, decatizing and the like can lend to the sheet the character of noble wool sheets.

EXAMPLE

The invention will be explained by means of the following embodiment:

WOVEN FABRIC TO BE FINISHED

Warp yarns OE-rotor yarn VIF 50% wool 50% 170 tex×24 tex
weft yarns OE-rotor yarn VIF 50% wool 50% 170 tex
warp thread thickness 91.3/10 cm
weft thread thickness 82/10 cm
binding K(2/2)
surface measurement 285 g/m²

FIBER FLEECE AS FINISHING AREA

100% lambswool carded fleece
surface measurement approximately 20 g/m²

These webs are supplied to a needle device, and needled together, with a perforation frequency of 210–240/cm². The textile web with a surface covering nap is supplied to an additional, already known finishing process.

It thus will be seen that there is provided a textile sheet with specific surface effects, and a method for producing the textile sheet, which attain the various objects of the invention, and which are well adapted for the conditions of practical use. As numerous alternatives within the scope of the present invention, besides those alternatives, variations, embodiments and equivalents mentioned supra, will occur to those skilled in the art, it will be understood that the present invention is to be limited only by the scope and content of the recitations in the appended claims, and functional and structural equivalents thereof.

We claim:

1. A finished textile sheet article having specific surface effects including one or more of surface stability, pattern and needleloom felt character, fulling and raising-like effects, high hairiness, loose cross-section, high wool portion of the yarn, fulling-like fiber displacements, and a nap on the surface, which comprises a finished textile sheet having a high wool portion, said finished textile sheet having at least one specific surface effect, and being derived from an initial textile sheet having a predominantly low wool portion and including yarns or threads of yarn or thread strengths typical for carded yarns, and having a firm round yarn cross-section, and low hairiness, the surface of said initial textile sheet being penetrated by wool fiber portions, said wool fiber portions extending at least partially through the entire thickness of said initial textile sheet, so that said yarns or threads are penetrated with fibers from said wool fiber portions.

2. A method for the finishing of a textile sheet having specific surface effects including one or more of surface stability, pattern and needleloom felt character, fulling and raising-like effects, high hairiness, loose cross-section, high wool portion of the yarn, fulling-like fiber displacements, and a nap on the surface, which comprises:
   (a) providing an initial textile sheet, said initial textile sheet including yarns or threads of yarn or thread strengths typical for carded yarns, and having a firm round yarn cross-section, low hairiness, and predominantly low wool portion;
   (b) providing a wool fleece remnant or the like, said wool fleece remnant constituting the origin of a wool fiber portion;
   (c) locating said wool fleece remnant of step (b) on at least one surface of said initial textile sheet;
   (d) removing said wool fiber portion of step (b) from said wool fleece remnant, and concomitantly penetrating said surface of said initial textile sheet with said wool fiber portion, and displacing said wool fiber portion at least partially through the entire thickness of said initial textile sheet, and thereby penetrating said yarns or threads with fibers from said wool fiber portion; and
   (e) recovering a product textile sheet, said product textile sheet having at least one specific surface effect, due to a higher wool portion than said initial textile sheet.

3. The method for the finishing of a textile sheet to produce the specific surface effects of claim 2, in which the initial textile sheet comprises yarns or threads selected from the group consisting of rotor (open end), Murata-Jet, sirospun, and friction yarn.

4. The method for the finishing of a textile sheet to produce the specific surface effects of claim 2, in which the wool fibers are derived from a pre-strengthened fleece.

5. The method for the finishing of a textile sheet to produce the specific surface effects of claim 2, in which the finished sheet contains fiber materials and fiber parts having relatively large staple length and dispersion width, and high wool portion.

6. The method for the finishing of a textile sheet to produce the specific surface effects of claim 2, in which the low wool portion of the initial textile sheet is less than 50%, and the wool portion of the finished textile sheet is higher than 50%.

7. The method for the finishing of a textile sheet to produce the specific surface effects of claim 2, in which step (d) comprises the perforation of the surface of the initial textile sheet with a plurality of needles.

8. The method of claim 7, in which the needles are CB notched needles, acting in the diametral needle perforation direction.

9. The method of claim 7, in which the plurality of needles penetrate through the entire thickness of the initial textile sheet, and up to the opposite surface of the initial textile sheet.

10. The method of claim 7, in which the plurality of needles are part of a multiple one or two sided needle device, a needleloom felt machine, or the like.

11. The method of claim 7, in which the plurality of needles perforate the surface of the initial textile sheet by passing substantially perpendicularly to the surface of the initial textile sheet.

12. The method of claim 7, in which the needle perforations are in the range of about 50 to 1200 perforations per square centimeter.

13. The method of claim 12, in which the needle perforations are in the range of about 210 to 240 per square centimeter.

14. The method for the finishing of a textile sheet to produce the specific surface effects of claim 2, in which the wool fleece remnant is located on both surfaces of the initial textile sheet.

15. The method for the finishing of a textile sheet to produce the specific surface effects of claim 2, in which the wool fiber portion of step (d) contains wool fibers with relatively high staple length dispersion width.

16. The method of claim 5, in which the wool fibers are derived from lambswool, mohair, or rag wool.

17. The method of the finishing of a textile sheet to produce the specific surface effects of claim 2, in which the product textile sheet is further processed, to produce a sheet having the character of noble wool sheets, by a cutting, pile rotation, or decatizing finishing process.

18. The method for the finishing of a textile sheet to produce the specific surface effects of claim 2, in which the finished textile sheet of step (e) has a nap or high hairiness due to the higher wool portion, said nap or high hairiness projecting from the surface of the finished textile sheet in the direction of penetration according to step (d).

19. The method for the finishing of a textile sheet to produce the specific surface effects of claim 2, in which the wool fiber displacement from the wool fleece remnant through the initial textile sheet, and up to a surface of the initial textile sheet, is accompanied by a concomitant displacement of fibers from the entire cross section of the yarns or threads of the initial textile sheet, up to said surface of the initial textile sheet.

20. The method of claim 19, in which the displaced fibers extend substantially perpendicularly to the surface of the textile sheet.

* * * * *